US 9,117,490 B2

(12) United States Patent
Ida

(10) Patent No.: US 9,117,490 B2
(45) Date of Patent: Aug. 25, 2015

(54) CONNECTION TRAY UNIT FOR PORTABLE TERMINAL

(71) Applicant: TEAC Corporation, Tokyo (JP)

(72) Inventor: Kazuki Ida, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 14/500,715

(22) Filed: Sep. 29, 2014

(65) Prior Publication Data

US 2015/0091426 A1    Apr. 2, 2015

(30) Foreign Application Priority Data

Sep. 30, 2013   (JP) ................................. 2013-204312

(51) Int. Cl.
  *G11B 33/02*    (2006.01)
  *G11B 33/12*    (2006.01)
  *G11B 17/056*   (2006.01)

(52) U.S. Cl.
  CPC .............. *G11B 33/02* (2013.01); *G11B 33/122* (2013.01); *G11B 17/0565* (2013.01)

(58) Field of Classification Search
  USPC ................................................ 720/646–647
  See application file for complete search history.

(56) References Cited

U.S. PATENT DOCUMENTS

| | | | | |
|---|---|---|---|---|
| 5,535,093 | A * | 7/1996 | Noguchi et al. | 361/679.43 |
| 5,784,253 | A * | 7/1998 | Ooka et al. | 361/679.43 |
| 8,083,195 | B2 * | 12/2011 | Osada | 248/274.1 |
| 8,929,059 | B2 * | 1/2015 | Anwei et al. | 361/679.01 |
| 2008/0165508 | A1 * | 7/2008 | Wang et al. | 361/728 |

FOREIGN PATENT DOCUMENTS

JP            07287972 A    10/1995

* cited by examiner

*Primary Examiner* — Wayne Young
*Assistant Examiner* — Carlos E Garcia
(74) *Attorney, Agent, or Firm* — Seed IP Law Group PLLC

(57) ABSTRACT

In a CD player, a connection tray is mounted in a cabinet in a shiftable manner among a retracted position, a first projected position, and a second projected position. The connection tray has an upper tray and a lower tray. The upper tray has a first connector, a second connector, and a stopper. The lower tray has an unlock button, a movable plate, and a lock plate. A lock bracket is formed with a lock depression into which a lock boss is inserted to lock the connection tray in the first projected position, in shifting the connection tray forward from the retracted position. In a front surface of the lock bracket, a lock projection is formed. The lock projection receives the lock boss to lock the connection tray in the second projected position.

6 Claims, 15 Drawing Sheets

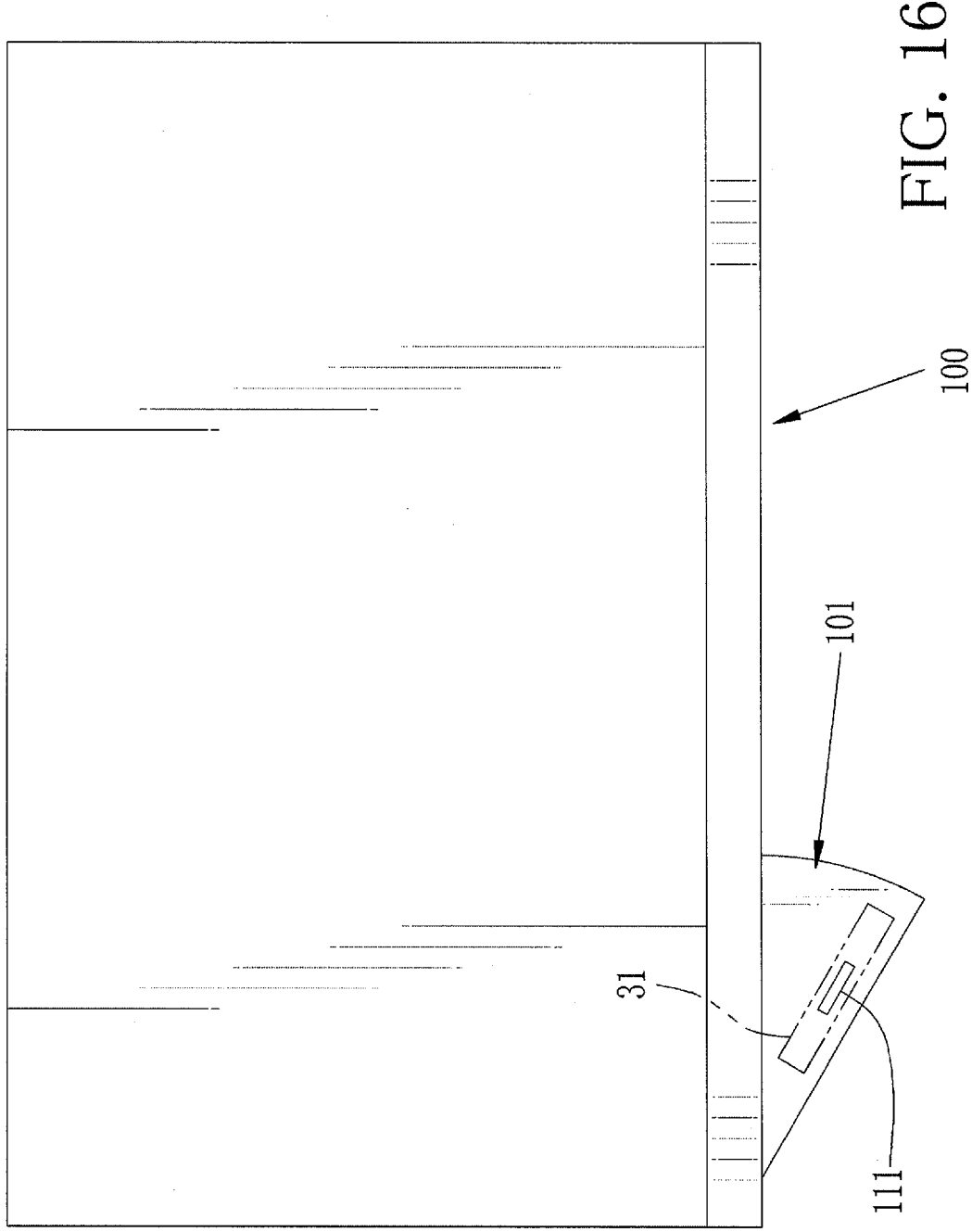

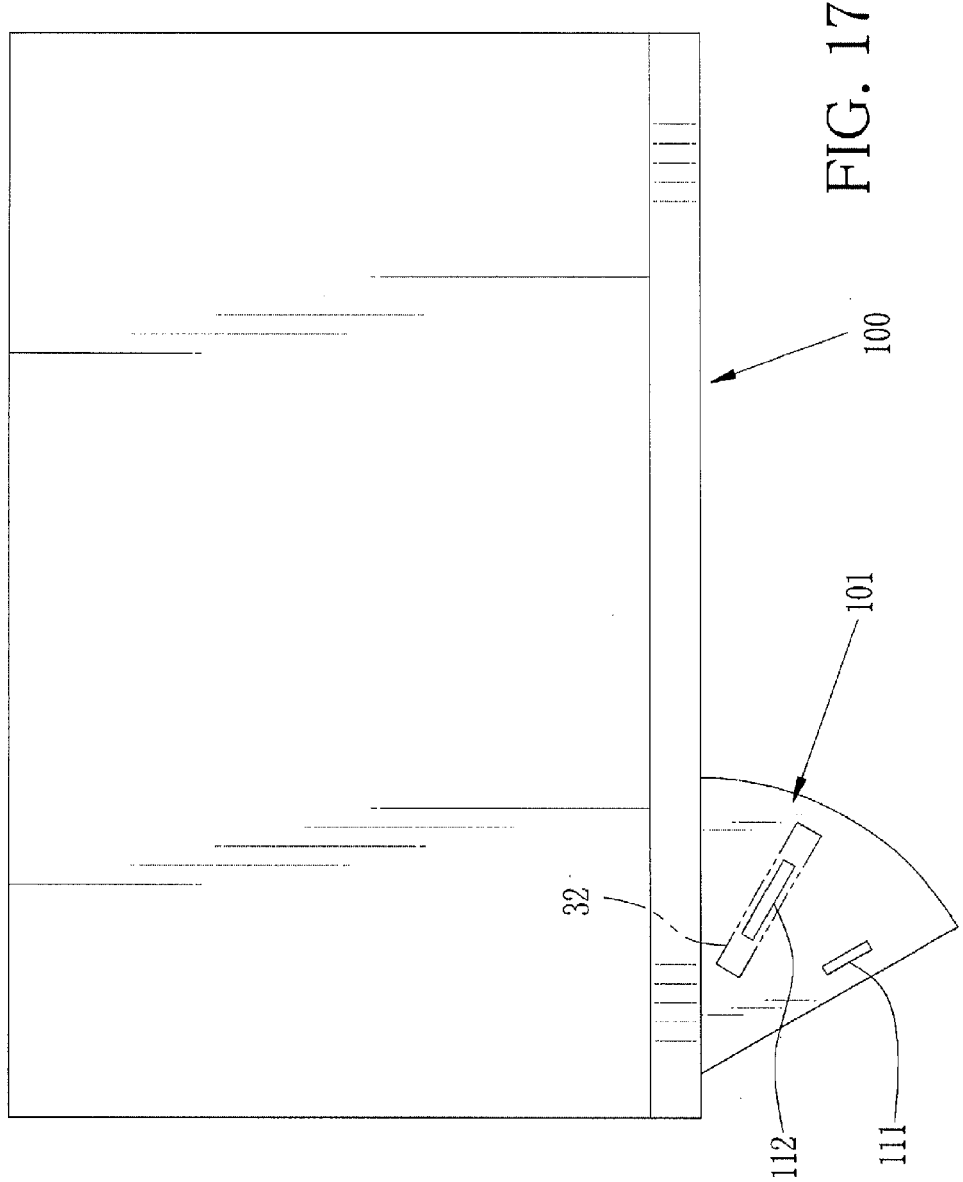

CONNECTION TRAY UNIT FOR PORTABLE TERMINAL

CROSS-REFERENCE TO RELATED APPLICATIONS

The present application claims priority under 35 U.S.C. §119 to Japanese Patent Application No. 2013-204312 filed on Sep. 30, 2013. The above application is hereby expressly incorporated by reference, in its entirety, into the present application.

BACKGROUND OF THE INVENTION

1. Field of the Invention

The present invention relates to a connection tray unit for a portable terminal that is drawable from a cabinet of electronic equipment.

2. Description Related to the Prior Art

In recent years, enjoying music by a portable terminal including a portable player, a cellular phone, and the like has become pervasive. The portable terminal contains a memory for recording the music, a player for reproducing the music, and the like in a cabinet, and has an LCD (liquid crystal display) for displaying information related to music reproduction, an operation button, and the like provided in a front panel. By choosing desired music by operating the operation button, the chosen music is reproduced and heard through an earphone or headphones.

The portable terminal is used outdoors with the headphones or the like, but often used indoors, like home, while being connected to electronic equipment such as a CD player. Music data read out of the portable terminal is subjected to signal processing by the electronic equipment and sent to a speaker. Thus, the music is reproduced with powerful volume.

A videotape recorder described in Japanese Patent Laid-Open Publication No. 07-287972 is provided with a connection tray (referred to as a door portion), which is movable between a retracted position retracted into a cabinet of the videotape recorder (electronic equipment) and a projected position drawn out of the cabinet. This connection tray has a connector to which a video camera is connected. To connect the video camera, the connection tray is drawn to the projected position. Connecting the video camera to the connector allows dubbing from a video tape loaded in the video camera on another video tape loaded in the videotape recorder.

The portable terminal is redesigned by model changeover and a new product is released periodically. The new product sometimes adopts a connector of a new standard. To make both of the new and old products available, two types of connectors are necessary. In this case, an adapter is often prepared and connected to the old type connector, and the new type of portable terminal is connected to the adapter. However, using the adapter increases the height of the new type of portable terminal by the thickness of the adapter. Therefore, in using the electronic equipment in a state of being mounted on a rack, the rack hinders the loading of the new type of portable terminal.

For this reason, it is conceivable to provide a plurality of different types of connectors in parallel on a connection tray, so that various types of portable terminals are loadable thereon. In this case, reliable positioning operation of the connection tray is required such that each portable terminal is loaded in an appropriate position.

SUMMARY OF THE INVENTION

An object of the present invention is to provide a connection tray unit for a portable terminal that reliably performs positioning operation of a connection tray.

To achieve the above and other objects, a connection tray unit for a portable terminal according to the present invention includes a connection tray, a first connector, a second connector, a locking mechanism, and an unlocking mechanism. The connection tray is shiftable from a retracted position retracted into a cabinet through a first projected position pulled out of the cabinet to a second projected position, and shiftable in an opposite direction thereof. The first connector, being attached to the connection tray, is connected to a first type portable terminal device in the first projected position. The second connector, being attached to the connection tray, is connected in the second projected position to a second type portable terminal device having a connection method different from the first type portable terminal device. The locking mechanism locks the connection tray in the first and second projected positions to prevent a shift of the connection tray. The unlocking mechanism unlocks the locking mechanism to allow the shift of the connection tray.

The locking mechanism preferably includes a lock plate, a lock bracket, a lock depression, and a lock projection. The lock plate has a lock boss, and is attached to the connection tray in a displaceable manner. The lock bracket displaces the lock plate by contacting the lock boss, while the connection tray is shifted from the retracted position to the second projected position. The lock depression is formed in the lock bracket. The lock boss is inserted into the lock depression upon shifting the connection tray to the first projected position, so that the connection tray is locked in the first projected position. The lock projection is formed in the lock bracket. The lock projection receives the lock boss upon shifting the connection tray to the second projected position, so that the connection tray is locked in the second projected position.

Furthermore, the unlocking mechanism preferably includes an unlock button provided in the connection tray, and a movable plate coupled to the unlock button. The movable plate is moved in conjunction with operation of the unlock button, and the movement of the movable plate deforms the lock plate so as to unlock the locking mechanism.

It is preferable that the connection tray unit for the portable terminal further include a retraction locking mechanism for locking and unlocking the connection tray in the retracted position.

It is preferable that the connection tray unit for the portable terminal further includes a stopper provided in the connection tray. The stopper is turnable between a raised position raised behind the first connector and a folded position. The stopper bears a rear surface of the first type portable terminal device connected to the first connector in the raised position.

If the connection tray is shifted toward the retracted position in a state where the stopper is set in the raised position, the stopper preferably bumps against the cabinet and turns to the folded position.

The connection tray unit for the portable terminal according to the present invention is provided with a locking mechanism that locks the connection tray in each of the first projected position in which the first type portable terminal device can be connected and the second projected position in which the second type portable terminal device can be connected, in the course of drawing out the connection tray. This eases positioning of the connection tray in the projected positions. Also, this prevents an unintentional shift of the connection tray from each projected position. Therefore, it is possible to prevent a situation in which the unintentional shift of the connection tray causes a bump of the portable terminal device against the cabinet and damage to the connectors and the like.

BRIEF DESCRIPTION OF DRAWINGS

For more complete understanding of the present invention, and the advantage thereof, reference is now made to the subsequent descriptions taken in conjunction with the accompanying drawings, in which:

FIG. 16 is a plan view of a CD player according to another embodiment provided with a turnable connection tray; and FIG. 17 is a plan view of the CD player in which the connection tray is turned to a second projected position.

DESCRIPTION OF THE PREFERRED EMBODIMENTS

Figure 1:
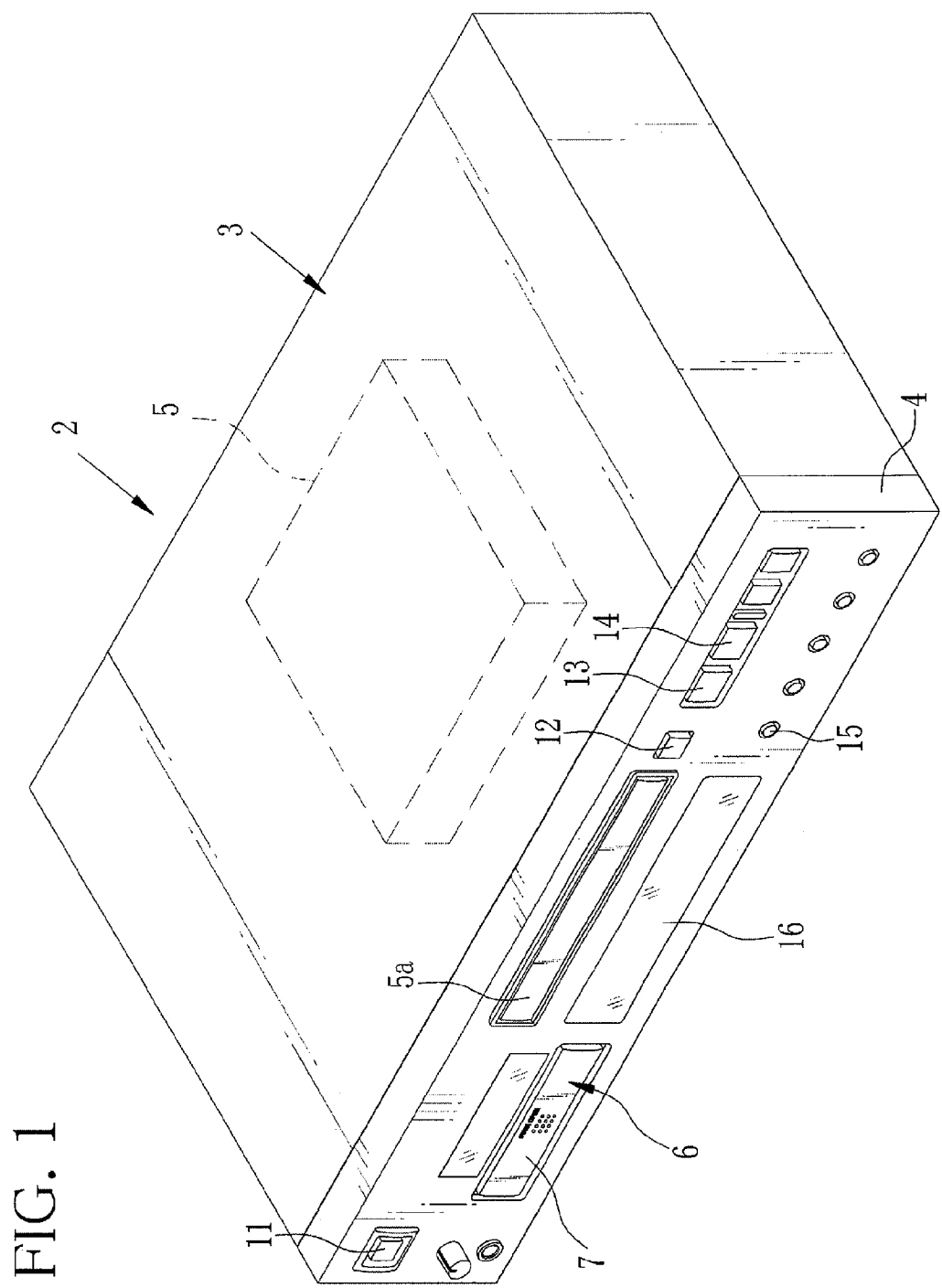
FIG. 1 is a perspective view of a CD player provided with a connection tray unit for a portable terminal according to the present invention.
Figure 2:
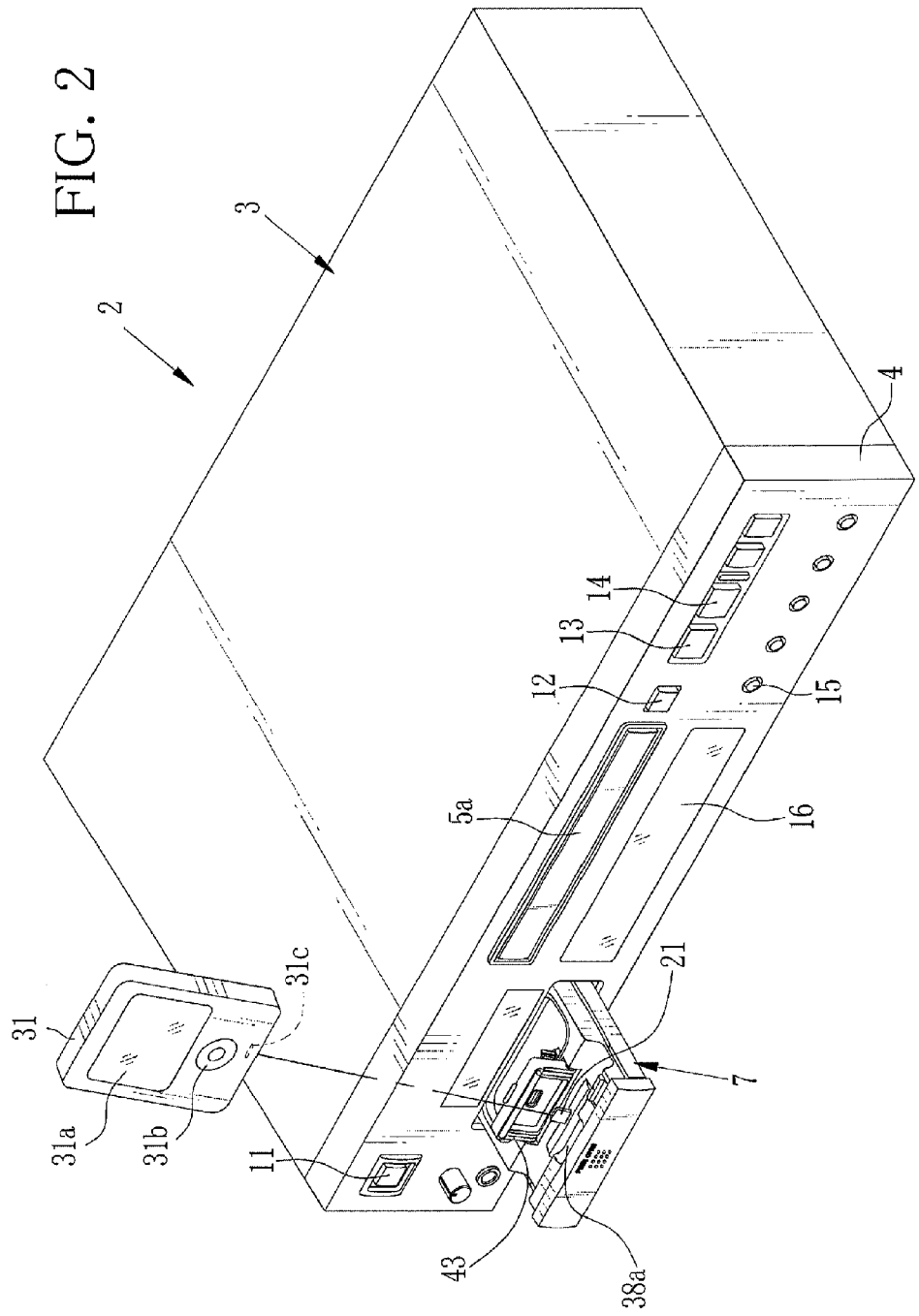
FIG. 2 is a perspective view of the CD player in which a connection tray is drawn to a first projected position.
Figure 3:
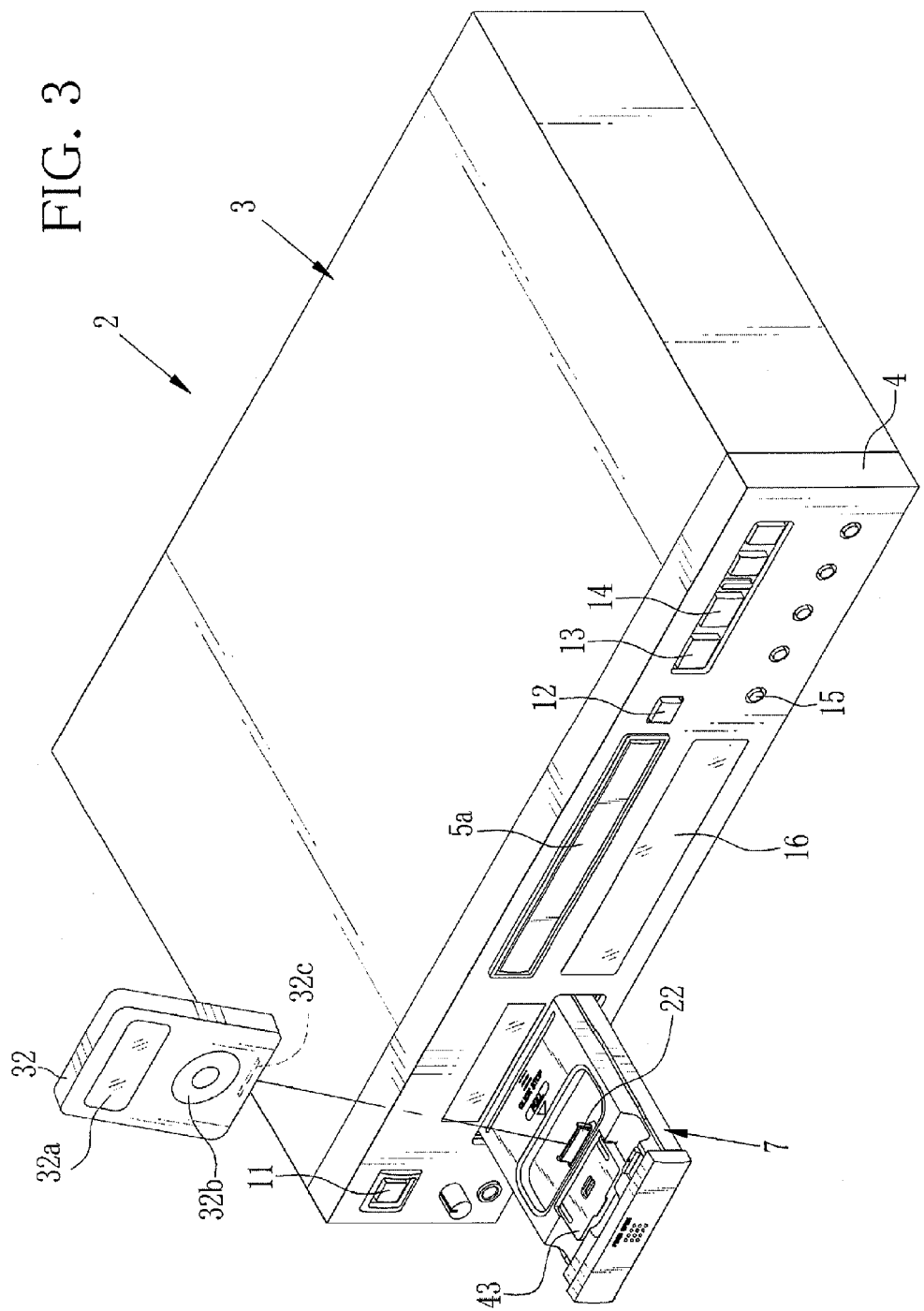
FIG. 3 is a perspective view of the CD player in which the connection tray is drawn to a second projected position.
Figure 4:
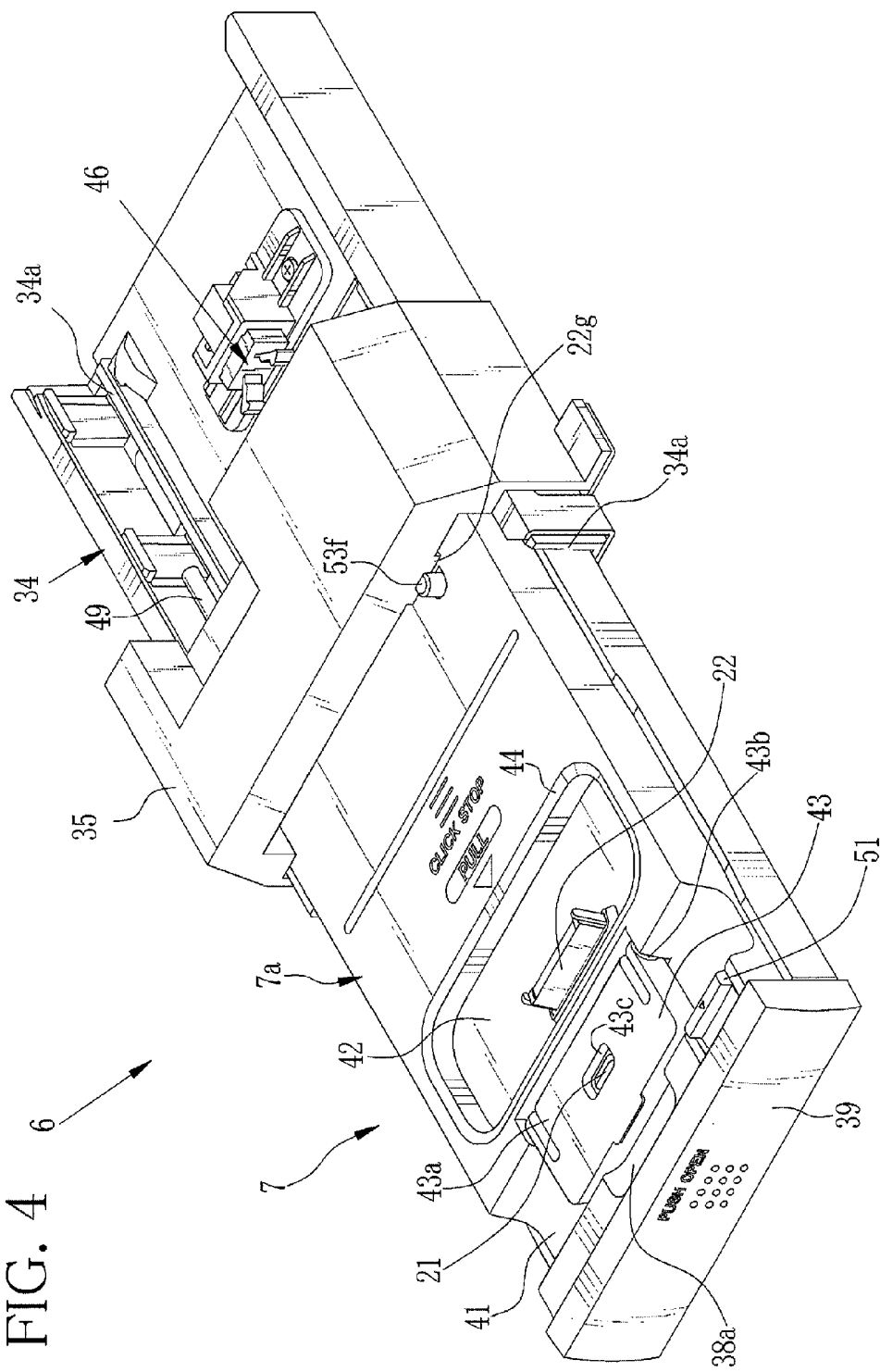
FIG. 4 is a perspective view of an example of the connection tray unit for the portable terminal in a state of drawing out the connection tray.
Figure 5:
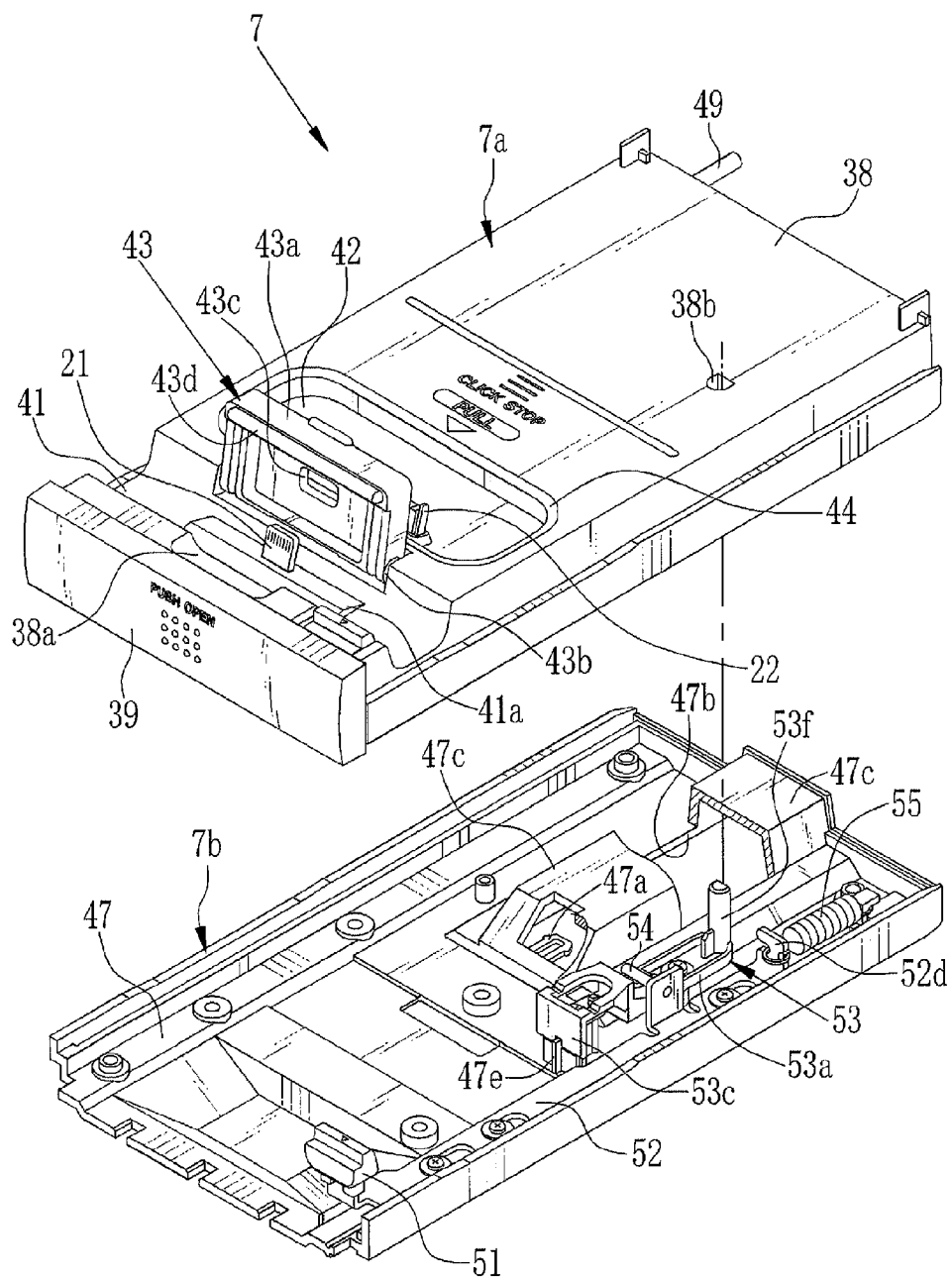
FIG. 5 is a perspective view of the connection tray dismantled into an upper tray and a lower tray.
Figure 6:
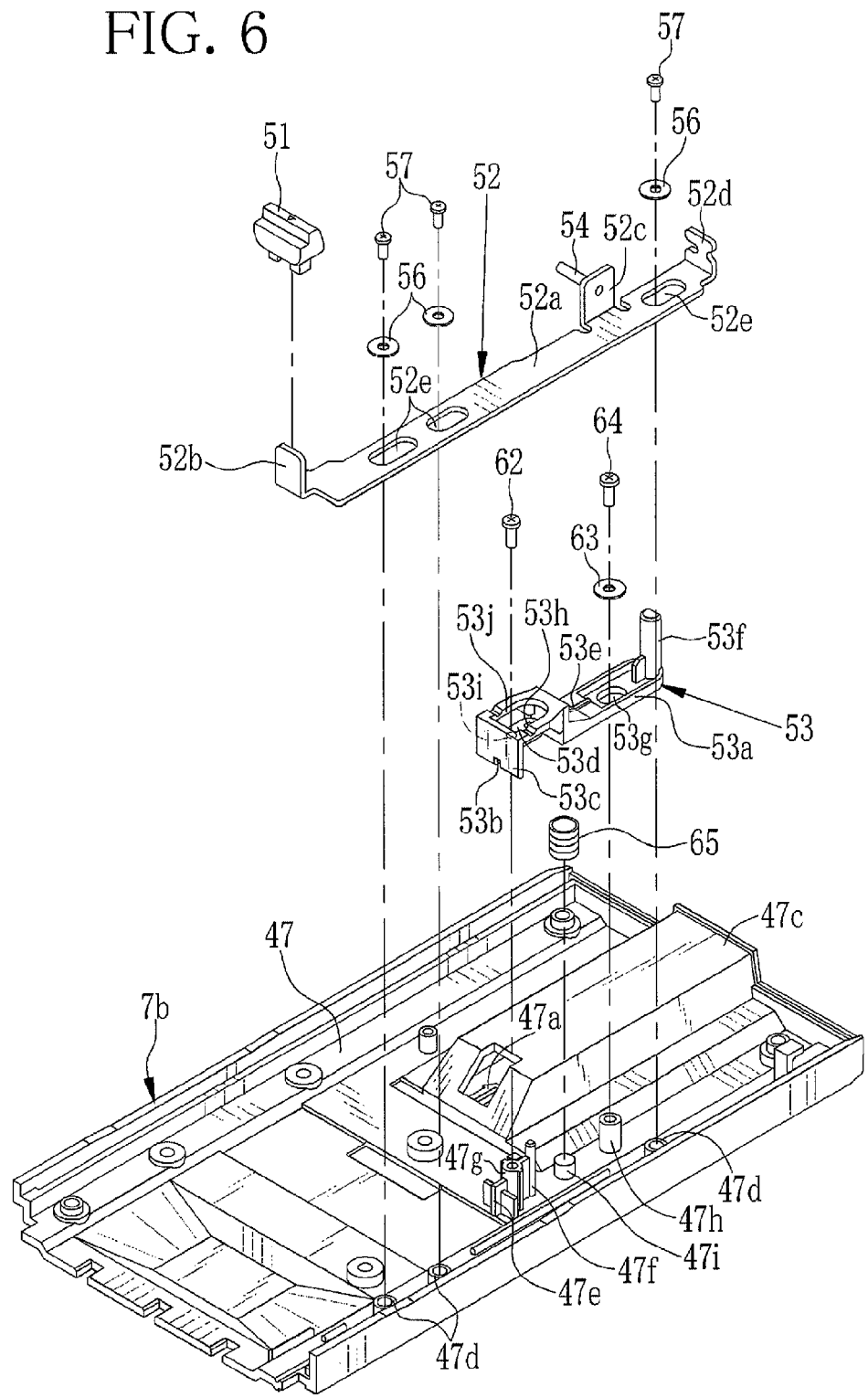
FIG. 6 is an exploded perspective view of the lower tray.

As shown in FIGS. 1 to 3, a CD player 2 includes a box-shaped cabinet 3 for containing a CD player circuit 76 (see FIG. 13) therein. The CD player 2 is connected to a speaker via an amplifier (neither is shown) so that music or the like is reproduced with powerful volume. The cabinet 3 has a front panel 4 attached on a front side.

The cabinet 3 contains a disk drive 5 and a connection tray unit 6 for a portable terminal. A disk tray 5a of the disk drive 5 and a connection tray 7 of the connection tray unit 6 are drawable from the front panel 4.

The front panel 4 is provided with various operation buttons including a power button 11, an open/close button 12 for opening and closing the disk tray 5a, a play button 13, a stop button 14, a select button 15, and the like, and an LCD 16. Operating the select button 15 chooses which of a CD and a portable terminal to reproduce.

As is widely known, the disk tray 5a for holding the CD is shiftable between a retracted position retracted into the cabinet 3 and a projected position drawn out of the cabinet 3. The disk tray 5a is shifted by a well-known tray shift mechanism having a motor, a gear, and the like.

The disk drive 5 contained in the cabinet 3 is provided with a pickup head and a spindle motor for rotating the CD (neither is shown), as is widely known. The pickup head is shiftable in a radial direction of the CD. Provided that the disk tray 5a is set in the retracted position, the pickup head accesses the CD rotated by the spindle motor.

The connection tray 7 is shifted among a retracted position shown in FIG. 1, a first projected position shown in FIG. 2, and a second projected position shown in FIG. 3. In setting the connection tray 7 in the first projected position, a first type portable terminal device 31 is connected to a first connector 21 provided on the connection tray 7. In setting the connection tray 7 in the second projected position, a second type portable terminal device 32 is connected to a second connector 22 provided on the connection tray 7.

In this embodiment, the first type portable terminal device 31 is of a new type having eight pins, for example. The second type portable terminal device 32 is of an old type having thirty pins, for example.

The first type portable terminal device 31 has an LCD 31a and an operation button 31b at its front surface, and has a first type terminal 31c to be connected to the first connector 21 at its bottom surface. The first type portable terminal device 31 contains a controller and a rewritable memory recording music data. Likewise, the second type portable terminal device 32 has an LCD 32a, an operation button 32b, and a second type terminal 32c to be connected to the second connector 22, a controller, and a rewritable memory recording music data.

As shown in FIGS. 4 to 7, the connection tray unit 6 is constituted of the connection tray 7, a guide unit 34 for holding the connection tray 7 in a slidable manner, and a lock bracket 35 attached to a distal end side of the guide unit 34. The guide unit 34, being in the shape of a top-opened channel, is secured inside the cabinet 3. The guide unit 34 is provided with a pair of rails 34a, which supports the connection tray 7 in a shiftable manner, on its left and right inner surfaces. The connection tray 7 supported by the rails 34a can be shifted from the retracted position retracted into the cabinet 3 through the first projected position drawn out of the cabinet 3 to the second projected position, and can be shifted in an opposite direction.

The connection tray 7 is constituted of an upper tray 7a and a lower tray 7b, which are secured with screws (not shown). A front bezel 39 is attached to a front surface of an upper tray body 38 of the upper tray 7a. The upper tray body 38 is formed with a recessed first dock 41 and a recessed second dock 42 arranged in a back-and-forth direction. The first connector 21 of the eight pins is attached on the first dock 41. The second connector 22 of the thirty pins is attached on the second dock 42. A stopper 43 is provided behind the first dock 41 to bear the first type portable terminal device 31. The first dock 41 is formed with a bump 41a, which is inclined, for example, 15° with respect to a horizontal direction. Since the first connector 21 is attached to the bump 41a, the first connector 21 is also inclined 15° backward with respect to the horizontal direction. Likewise, a bottom surface of the second dock 42 is inclined backward at 15°, and hence the second connector 22 is inclined too at the same angle.

The stopper 43 stabilizes the first type portable terminal device 31 such that the first type portable terminal device 31 does not fall. The stopper 43, which includes a base portion 43a and a shaft 43b, is attached on the upper tray body 38 in a rotatable manner about the shaft 43b. The stopper 43 is rotatable between a raised position (see FIGS. 2, 5, and 7) raised at approximately 80° behind the first connector 21 to bear the first type portable terminal device 31 and a folded position (see FIGS. 3 and 4). The base portion 43a is formed with a relief opening 43c for preventing the base portion 43a from contacting the first connector 21 in the folded position, and a bump 43d for bearing the first type portable terminal device 31. The upper tray body 38 is formed with a depression 38a into which a finger is put in turning the stopper 43 from the folded position to the raised position.

The second dock 42 is attached with a ring-shaped adapter 44 into which the bottom periphery of the second type portable terminal device 32 is fitted. This adapter 44 is made of soft plastic or hard rubber so as not to damage the second type portable terminal device 32.

The guide unit 34 is provided with a well-known push locking mechanism 46 to lock the connection tray 7 in the retracted position. A lower tray body 47 of the lower tray 7b is formed with a lock lug 47a that is to be locked in the push locking mechanism 46. The push locking mechanism 46 is locked by pushing the connection tray 7 into the retracted position, and is unlocked by further pushing by a little amount the connection tray 7 that is locked in the retracted position.

The lower tray body 47 is formed with a cutout 47b extending in a draw-out direction and a cover 47c for covering the cutout 47b. The lock lug 47a is formed at an end of the cover 47c. Thus, the push locking mechanism 46 gets into the cover 47c and engages with the lock lug 47a.

The upper tray body 38 is provided at its rear end with an eject shaft 49, which is shiftable in the back-and-forth direction, to eject the connection tray 7. This eject shaft 49 is inserted into a coil spring (not shown). Upon shifting the connection tray 7 to the retracted position, a rear end of the eject shaft 49 makes contact with a rear interior wall of the cabinet 3, so that the eject shaft 49 is shifted forward with compressing the coil spring. Thus, locking the connection tray 7 in the retracted position brings about a state of compressing the coil spring. Then, upon unlocking the connection tray 7, the eject shaft 49 pushes the connection tray 7 forward by force of the coil spring. This push makes the connection tray 7 projected into a position just before the first projected position (see FIG. 2) in this embodiment.

The lower tray body 47 is attached with an unlock button 51, a movable plate 52, and a lock plate 53. The movable plate is coupled to the unlock button 51 and shifted in the back-and-forth direction in conjunction with operation of the unlock button 51. The lock plate 53 moves with being deformed in conjunction with the movable plate 52. The unlock button 51 protrudes from an opening formed in the upper tray body 38.

The movable plate 52 is formed with a plate-shaped base portion 52a, an attachment portion 52b to which the unlock button 51 is attached, an erected portion 52c, and a spring hook 52d. The base portion 52a is formed with three oval slots 52e. A pin 54 is secured to the erected portion 52c. A coil spring 55 is hooked between the spring hook 52d and the lower tray body 47. This coil spring 55 biases the movable plate 52 backward. Through the oval slots 52e, cylinders 47d formed in the lower tray body 47 are inserted. The movable plate 52 is attached in a shiftable manner in the back-and-forth direction with screws 57, each of which is secured to a hole of the cylinder 47d via a washer 56.

The lock plate 53, which is made of resin, is provided with a plate-shaped base portion 53a, an L-shaped positioning panel 53c formed with a slit 53b at its tip end, and a fixing panel 53d extending from the positioning panel 53c. The base portion 53a is formed with a ledge 53e, which contacts the pin 54 of the movable plate 52, at the middle of a top surface. The base portion 53a is formed with a lock boss 53f at its rear end, and an oval slot 53g between the ledge 53e and the lock boss 53f. The fixing panel 53d is formed with a positioning hole 53h and an insertion hole 53i. The positioning panel 53c is formed with an opening 53j for exposing the holes 53h and 53i. The upper tray body 38 is formed with an insertion hole 38b into which the lock boss 53f is inserted. This insertion hole 38b is longer than the lock boss 53f in the back-and-forth direction such that the lock boss 53f can move in the hole 38b more or less. The lock boss 53f protrudes from a top surface of the upper tray body 38 through the insertion hole 38b.

The lower tray body 47 is formed with a projection 47e to be inserted into the slit 53b, a positioning boss 47f to be inserted into the positioning hole 53h, a cylinder 47g for bearing the lock plate 53, a cylinder 47h to be inserted into the oval slot 53g, and a spring boss 47i. The positioning boss 47f is inserted into the positioning hole 53h, and a screw 62 is secured to a hole of the cylinder 47g through the insertion hole 53i in a state where the projection 47e is inserted into the slit 53b. Thus, the fixing panel 53d of the lock plate 53 is secured to the lower tray body 47. Moreover, a screw 64 is threaded via a washer 63 into a hole of the cylinder 47h that is inserted through the oval slot 53g. Since the fixing panel 53d is not coupled to the base portion 53a, a rear part of the lock plate 53 posterior to the fixing panel 53d is deformable. Into the spring boss 47i, a coil spring 65 is inserted. This coil spring 65 biases the lock plate 53 upward. As shown in FIGS. 8 to 12, a first tapered surface 35a, a second tapered surface 35b, a third tapered surface 35c, a shoulder 35d, and a fourth tapered surface 35e, which the lock boss 53f contacts in shifting the connection tray 7, are formed in an interior surface of the lock bracket 35 secured on the guide unit 34. A lock depression 35f into which the lock boss 53f is inserted to lock the connection tray 7 in the first projected position is formed between the second tapered surface 35b and the third tapered surface 35c. Note that, in FIGS. 8 to 12, the upper tray 7a and the guide unit 34 are omitted and only the lock bracket 35 is illustrated in cross section.

The lock bracket 35 is formed at its front surface with a lock projection 35g, which receives the lock boss 53f and locks the connection tray 7 in the second projected position. According to this embodiment, a locking mechanism 70 for locking the connection tray 7 in the first and second projected positions includes the lock plate 53 formed with the lock boss 53f, and the lock bracket 35 formed with the lock depression 35f and the lock projection 35g. A retraction locking mechanism for locking and unlocking the connection tray 7 in the retracted position includes the push locking mechanism 46 and the lock lug 47a. Note that the locking mechanism 70 may perform locking in the retracted position. In this case, the lock bracket 35 may be extended backward and formed with a lock depression to be used for locking in the retracted position.

Figure 13:
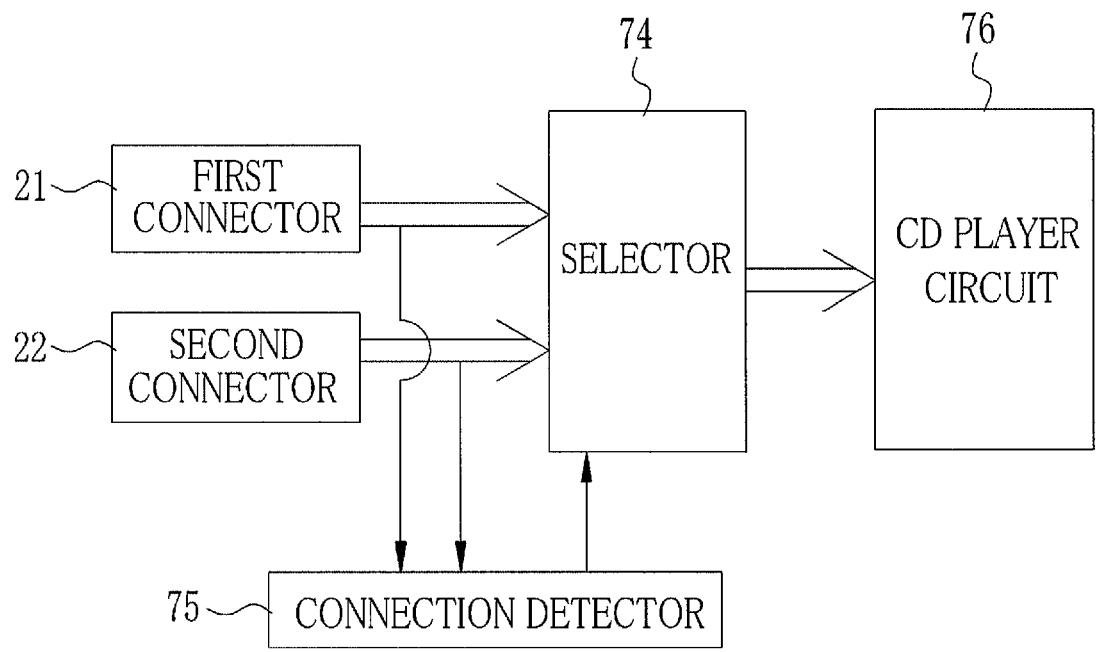
FIG. 13 is a circuit diagram of a switching circuit of a connector.

In setting the connection tray 7 in the second projected position, both of the first type portable terminal device 31 and the second type portable terminal device 32 are loadable onto the connection tray 7. In this case, the portable terminal that is loaded later is preferentially connected to the CD player 2. FIG. 13 shows a switching circuit for the preferential connection. The first and second connectors 21 and 22 are connected to a selector 74 and a connection detector 75. The connection detector 75 detects a connection state of the first and second type portable terminal devices 31 and 32 to the first and second connectors 21 and 22, and determines which of the first and second type portable terminal devices 31 and 32 is loaded later. According to the determination, a selection signal for selecting the connector to which the portable terminal is connected later is sent to the selector 74. This selector 74 selects one of the first and second connectors 21 and 22 connected later, and sends music data from the selected connector to the CD player circuit 76.

Note that, for example, a micro switch that is turned on by the lock boss 53*f* may be provided. At the instant when it is detected that the connection tray 7 is set in the second projected position by the turn-on of the micro switch, the selector 74 may be switched from the first connector 21 to the second connector 22.

Figure 14:
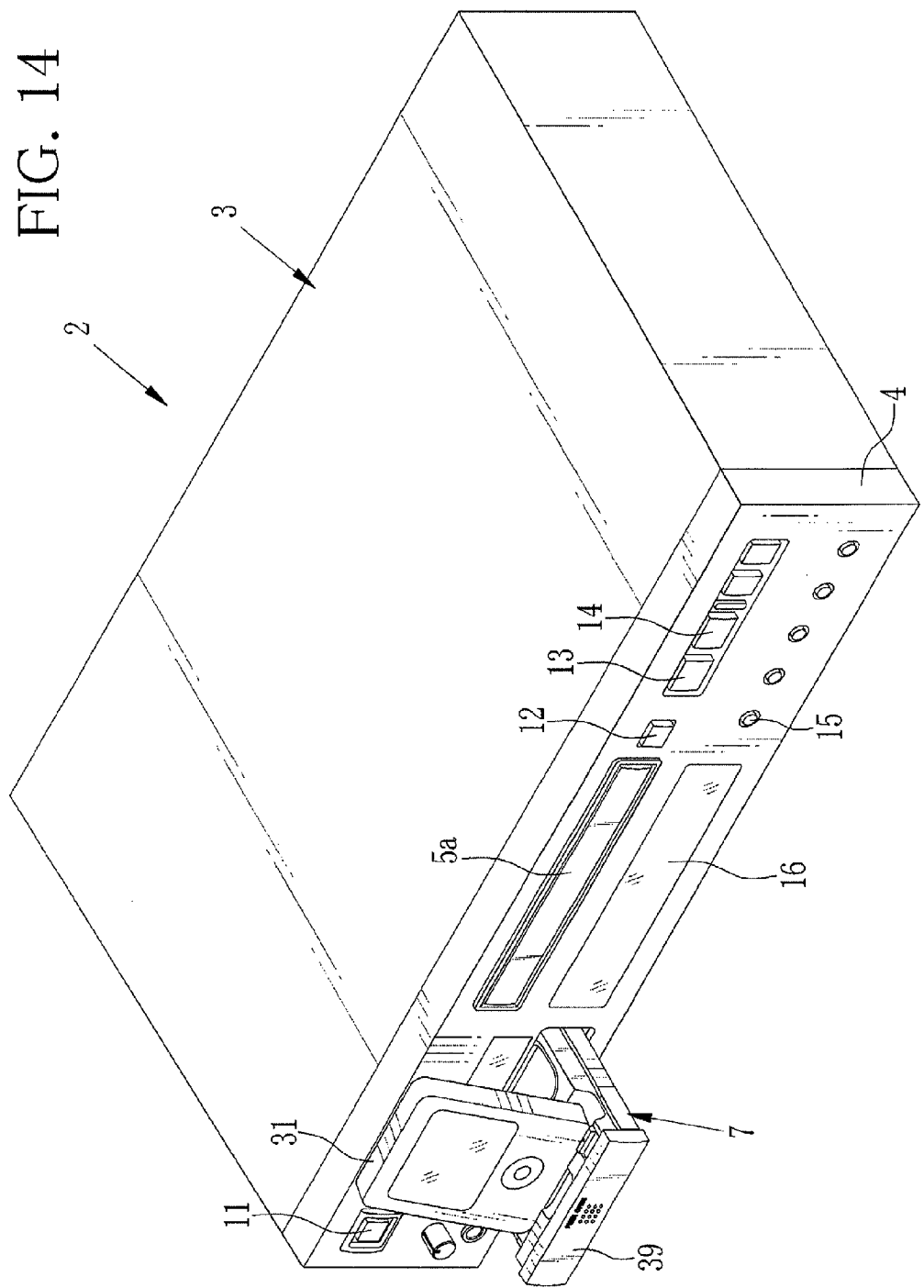
FIG. 14 is a perspective view of the CD player in which the first type portable terminal is loaded on the connection tray.

Next, the operation of the above embodiment will be described referring to FIGS. 14 and 15. To appreciate music or the like recorded to the portable terminal with the CD player 2, the portable terminal is loaded onto the connection tray 7.

For example, in the case of using the first type portable terminal device 31 being a new type, the connection tray 7 has to be drawn to the first projected position. In this case, the front bezel 39 of the connection tray 7 is lightly pushed with a hand. Pushing the front bezel 39 unlocks the push locking mechanism 46. Upon releasing the lock lug 47*a* from the push locking mechanism 46, the eject shaft 49 pushes the rear interior wall of the cabinet 3 due to the bias of the compressed coil spring, so the connection tray 7 is shifted from the retracted position shown in FIGS. 1 and 8 to a position just before the first projected position.

Figure 9:
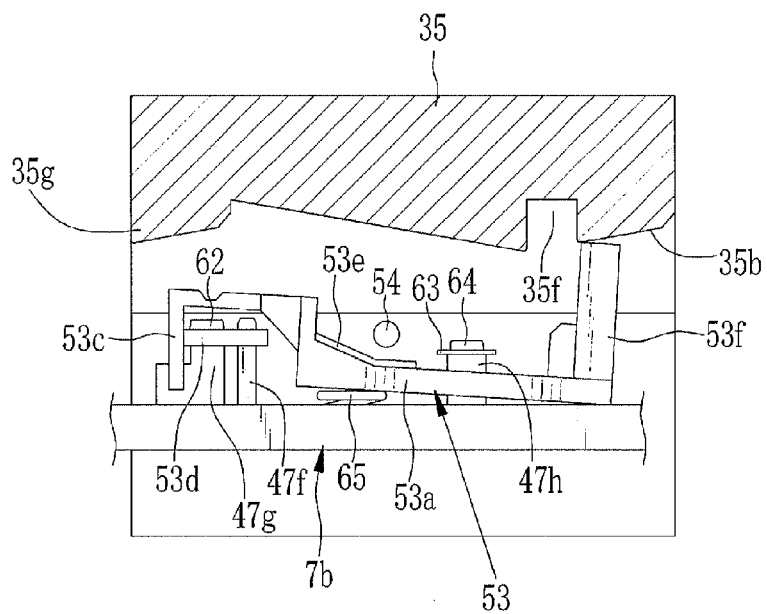
FIG. 9 is an explanatory view showing a state just before a first projected position.

After the shift to the position just before the first projected position, the connection tray 7 is shifted forward by holding the front bezel 39 with fingers. By the forward shift, as shown in FIG. 9, the lock boss 53*f* is pushed by the first tapered surface 35*a* and the second tapered surface 35*b* of the lock bracket 35. In the lock plate 53, the base portion 53*a* is displaced downward against the bias of the coil spring 65, while the positioning panel 53*c* is deformed more or less.

Figure 10:
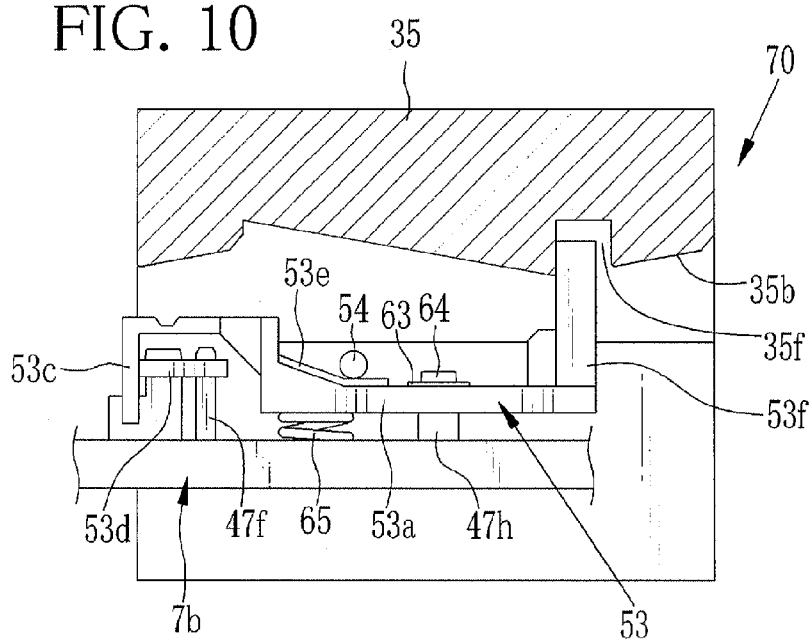
FIG. 10 is an explanatory view showing a state of the first projected position.

As shown in FIG. 10, upon shifting the connection tray 7 to a position where the lock boss 53*f* is opposite to the lock depression 35*f* of the lock bracket 35, the positioning panel 53*c* returns to its original shape and the base portion 53*a* is displaced upward due to the bias of the coil spring 65 in the lock plate 53. Therefore, the lock boss 53*f* is inserted into the lock depression 35*f* of the lock bracket 35, and hence the connection tray 7 is locked in the first projected position.

Figure 7:
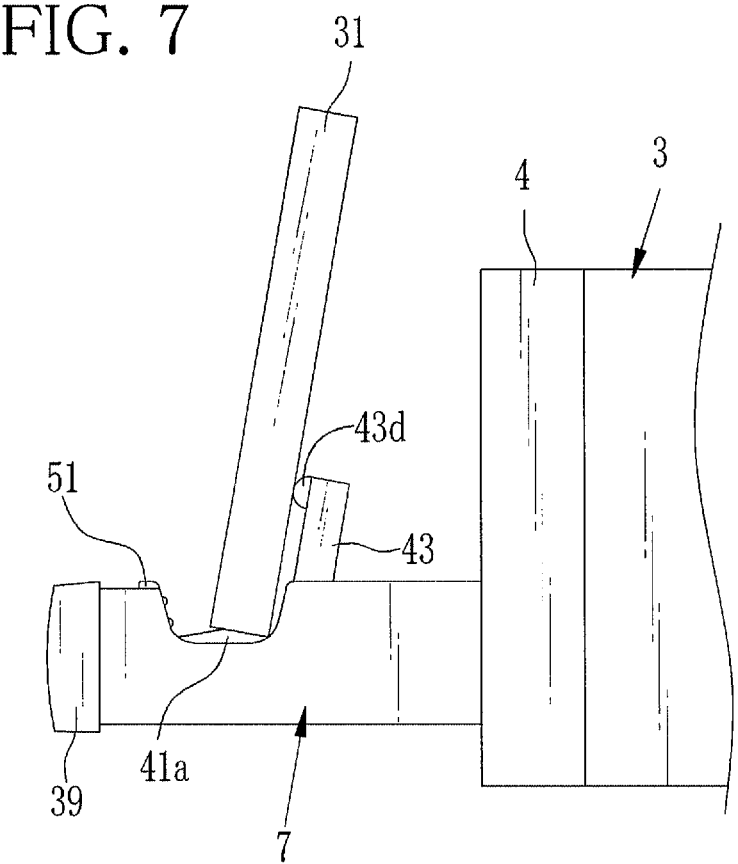
FIG. 7 is a side view of a first type portable terminal in a loaded state.
Figure 8:
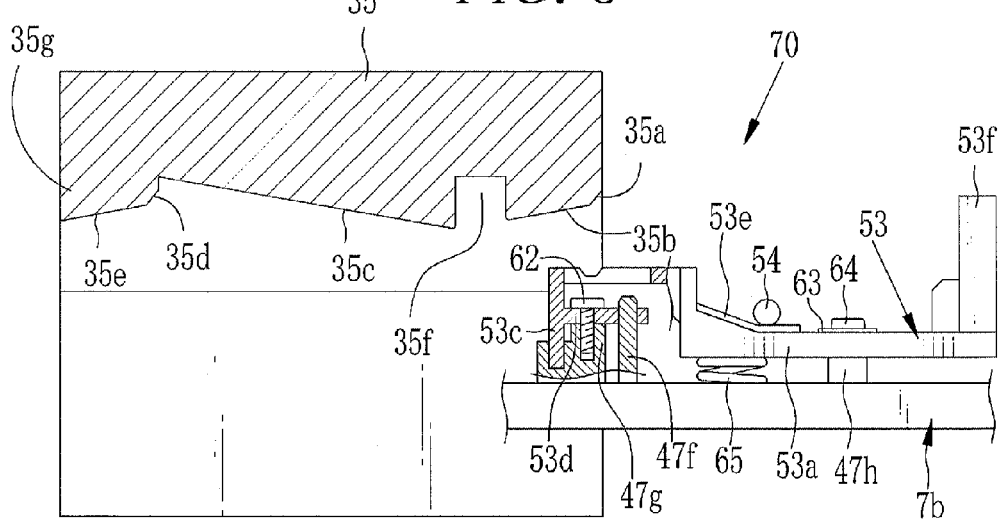
FIG. 8 is an explanatory view showing the relation between a lock bracket and a lock plate in a retracted position.

After the connection tray 7 is locked in the first projected position, the stopper 43 is manually turned to the raised position. Then, as shown in FIG. 14, a bottom end of the first type portable terminal device 31 is inserted into the first dock 41, and the first type terminal 31*c* is connected to the first connector 21. As shown in FIG. 7, since a rear surface of the first type portable terminal device 31 connected to the first connector 21 is borne by the stopper 43, so that the first type portable terminal device 31 can be stable without wobbling even if the operation button 31*b* provided in the front surface is pushed.

After the first type portable terminal device 31 is set onto the connection tray 7, a reproduction mode is chosen by operating the select button 15. Then, by operating the operation button 31*b* of the first type portable terminal device 31, one of music data files recorded to the memory of the first type portable terminal device 31 is chosen. The chosen music data is sent to the first connector 21, the selector 74, and the CD player circuit 76. The music data processed by the CD player circuit 76 is sent to the speaker connected to the CD player 2 via the amplifier (not shown), so the music is reproduced through the speaker.

Figure 11:
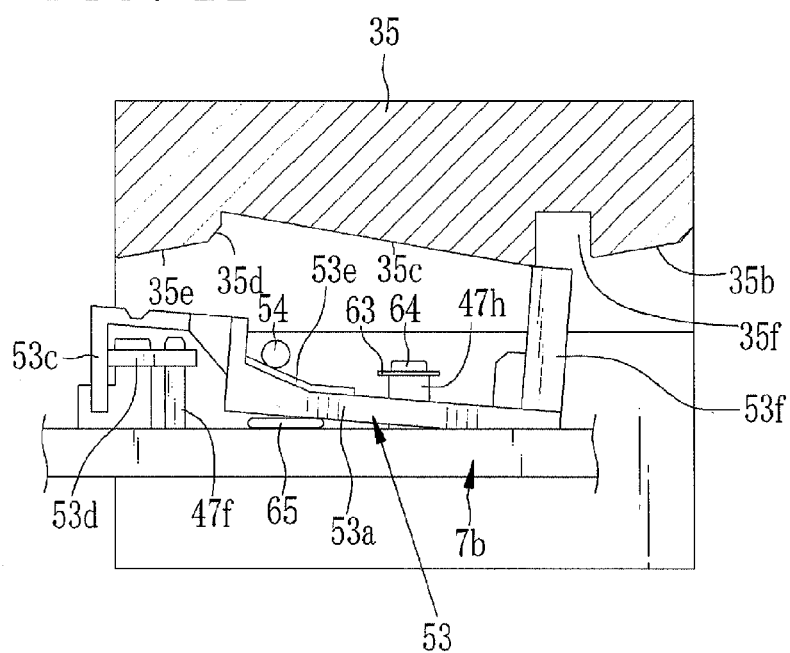
FIG. 11 is an explanatory view showing a state of being unlocked in the first projected position.

In the case of completing the use of the first type portable terminal device 31 and shifting the connection tray 7 to the retracted position, the first type portable terminal device 31 is pulled out of the first connector 21, and the stopper 43 is turned to the folded position. Then, the unlock button 51 is pushed forward. The forward push of the unlock button 51 shifts the movable plate 52 forward in conjunction therewith, and, as shown in FIG. 11, the lock plate 53 is displaced by being pushed by the pin 54 of the movable plate 52. Thus, the lock boss 53*f* is pulled out of the lock depression 35*f*, so the connection tray 7 is unlocked from the first projected position.

After being unlocked from the first projected position, the front bezel 39 is pushed so as to shift the connection tray 7 to the retracted position. Upon shifting the connection tray 7 to the retracted position, the lock lug 47*a* of the lower tray 7*b* is locked by the push locking mechanism 46 so that the connection tray 7 is locked in the retracted position.

In the case of shifting the connection tray 7 to the retracted position with maintaining the stopper 43 at the raised position, a rear surface of the stopper 43 bumps a front surface of the front panel 4, and the stopper 43 is turned to the folded position. Therefore, even if closing the stopper 43 is forgotten, the stopper 43 and the connection tray 7 do not get damaged.

To set the second type portable terminal device 32 being an old type onto the connection tray 7, the connection tray 7 has to be drawn from the retracted position shown in FIG. 1 to the second projected position shown in FIG. 3. In this case, the connection tray 7 is shifted to the first projected position by procedures described above. Since the connection tray 7 is locked in the first projected position, the connection tray 7 is unlocked by pushing the unlock button 51 forward.

The forward push of the unlock button 51 unlocks the connection tray 7 from the first projected position, as described above. Then, the connection tray 7 is shifted forward by holding the front bezel 39 with fingers. Shifting the connection tray 7 further forward from the first projected position, the lock boss 53*f* of the lock plate 53 moves with being pushed by the third tapered surface 35*c* of the lock bracket 35, and bumps the shoulder 35*d*. This applies a load to the connection tray 7, and thereby indicates approaching the second projected position.

Figure 12:
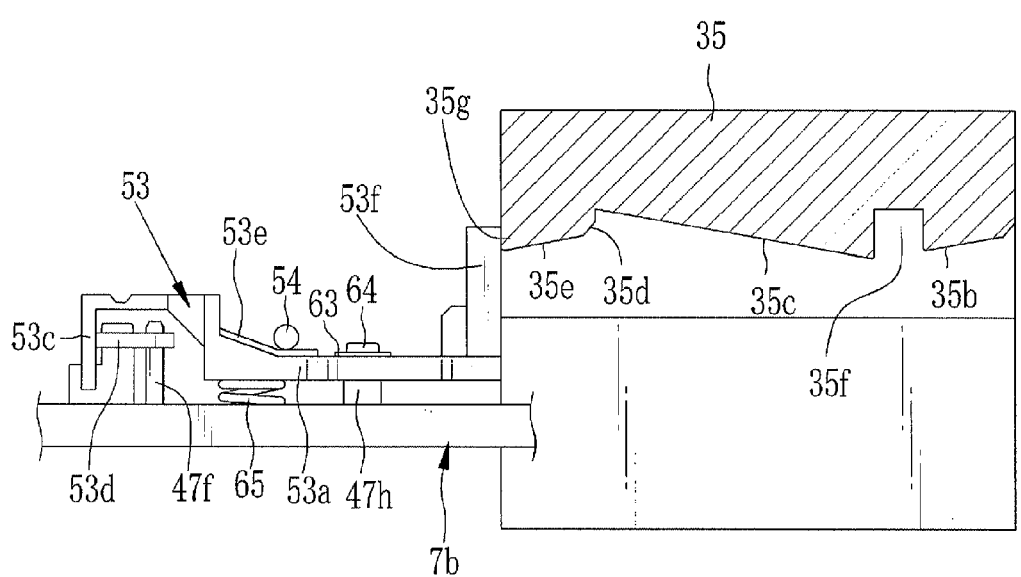
FIG. 12 is an explanatory view showing a state of a second projected position.

Furthermore, by slowly pulling the front bezel 39, the lock boss 53*f* climbs over the shoulder 35*d* and passes the fourth tapered surface 35*e*, and exits out of the lock bracket 35, as shown in FIG. 12. A distal end side of the lock plate 53 is turned back into the original shape and the lock boss 53*f* is displaced upward by the bias of the coil spring 65. Since the lock boss 53*f* is received by the lock projection 35*g* of the lock bracket 35, the connection tray 7 is locked in the second projected position. Note that engaging the connection tray 7 in a stopper (not shown) so as to block a forward shift of the connection tray 7 regulates the forward shift. Drawing out the connection tray 7 with keeping forward pushing the unlock button 51 makes it possible to draw out the connection tray 7 from the retracted position to the second projected position at a time without locking and unlocking in the first projected position.

Figure 15:
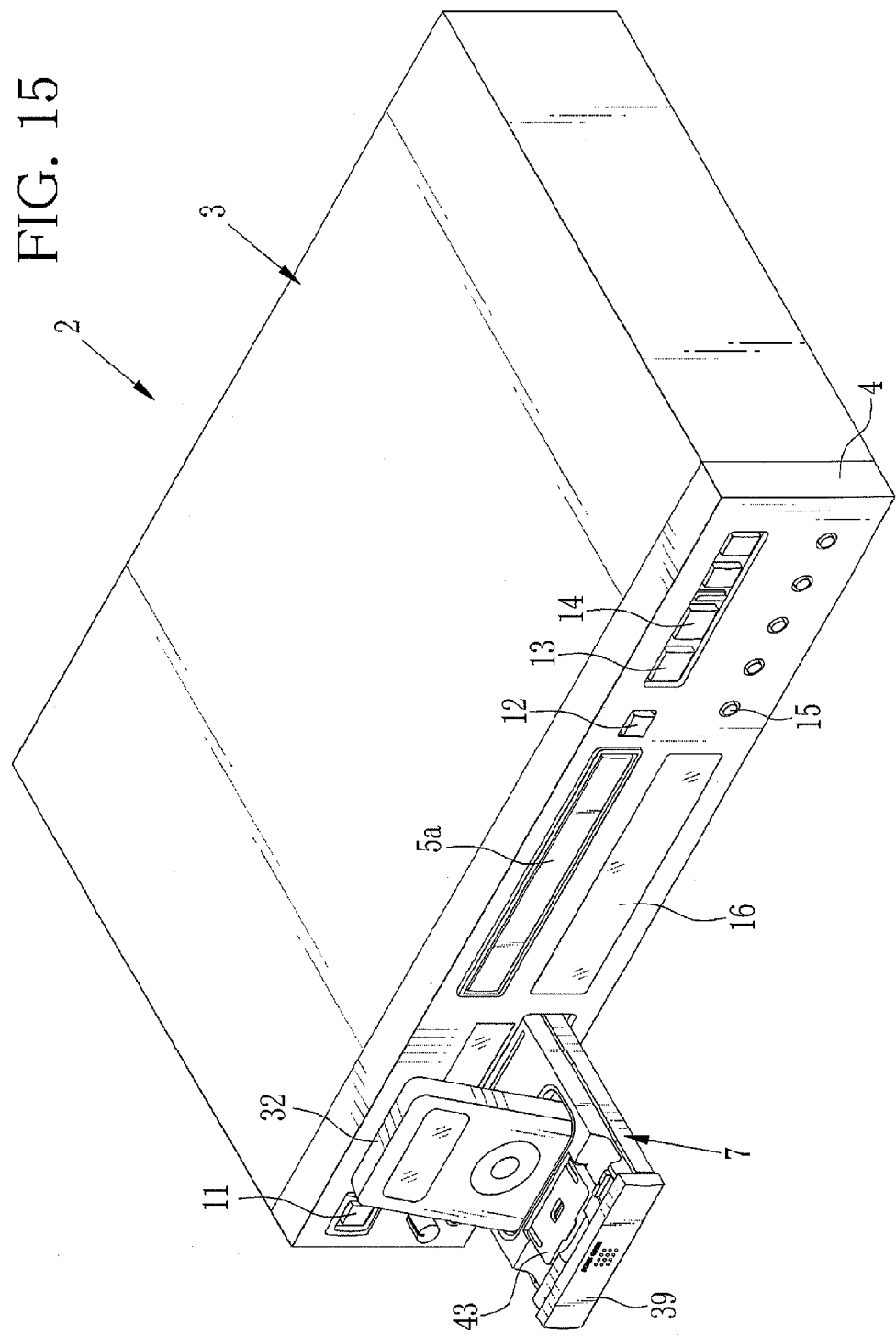
FIG. 15 is a perspective view of the CD player in which a second type portable terminal is loaded on the connection tray.

After the connection tray 7 is locked in the second projected position, as shown in FIG. 15, a bottom end of the second type portable terminal device 32 is inserted into the second dock 42, and the second type terminal 32*c* is connected to the second connector 22. Then, by playing the second type portable terminal device 32, the music data is sent to the speaker via the second connector 22, the selector 74, the CD player circuit 76, and the amplifier (not shown), and hence the music is reproduced through the speaker.

In the second projected position, the first type portable terminal device 31 is loadable in addition to the second type portable terminal device 32. In this case, the second type portable terminal device 32 is connected after loading the first type portable terminal device 31; for example, a signal indicating this connection state is sent to the connection detector 75. According to this signal, the connection detector 75 determines that the second connector 22 is connected after connection of the first connection 21. Based on this determination, the connection detector 75 sends to the selector 74 the selection signal for selecting the second connector 22 that is loaded later. According to this selection signal, the selector 74 releases the connection between the first type portable terminal device 31 and the CD player circuit 76, and instead connects the second type portable terminal device 32 to the CD player circuit 76.

To complete the use of the second type portable terminal device 32 in a state of loading only the second type portable terminal device 32, the connection tray 7 is shifted to the retracted position, and the second type portable terminal device 32 is pulled out of the second connector 22. Then, by a forward push of the unlock button 51, the pin 54 of the movable plate 52 displaces the lock plate 53 and the lock boss 53f is pulled out of the lock depression 35g. Thus, the connection tray 7 is unlocked from the second projected position. After the unlock from the second projected position, the front bezel 39 is pushed to shift the connection tray 7 backward.

By shifting the connection tray 7 backward from the second projected position, the lock boss 53f of the lock plate 53 is inserted into the lock depression 35f of the lock bracket 35 so that the connection tray 7 is locked in the first projected position. As described above, after unlocking the connection tray 7 from the first projected position, the connection tray 7 is shifted to the retracted position. Note that keeping forward pushing the unlock button 51 allows shifting the connection tray 7 from the second projected position to the retracted position at a time.

To shift the connection tray 7 from the first projected position and the second projected position to the retracted position, the connection tray 7 has to be unlocked by operating the unlock button 51. The connection tray 7 cannot be shifted without this operation. Thus, if the connection tray 7 is tried to be shifted while keeping connecting the first and second type portable terminal devices 31 and 32 to the first and second connectors 21 and 22, the first and second connectors 21 and 22 and the first and second type portable terminal devices 31 and 32 do not get damaged.

On the other hand, to play the CD, reproduction of the CD is chosen by operating the select button 15. The disk tray 5a is shifted to the projected position by operating the open/close button 12, and a CD is mounted on the disk tray 5a. Then, the disk tray 5a is shifted to the retracted position by operating the open/close button 12, so that the CD is caught between the spindle motor and a clamper, as is widely known. Upon operating the play button 13, the CD is rotated by rotation of the spindle motor, and the pickup head accesses the rotated CD to reproduce data of the CD.

As shown in FIGS. 16 and 17, a CD player 100 maybe provided with a connection tray 101 that is turnable between a retracted position and a second projected position (see FIG. 17) via a first projected position (see FIG. 16). This connection tray 101 is attached with a first connector 111 and a second connector 112 to which the first and second type portable terminal devices 31 and 32 are connectable, respectively. In this embodiment, just as with the above embodiment, a locking mechanism for locking the connection tray 101 in the first and second projected positions and an unlocking mechanism for unlocking the connection tray 101 are provided. Note that a stopper is omitted in FIGS. 16 and 17.

Note that, according to the above embodiment, the connection tray is locked and unlocked by deforming the lock plate, but the distal end side of the lock plate may be attached in a turnable manner. Furthermore, the lock plate may be movable or swingable in a vertical direction.

The connection tray is provided with the two connectors in the above embodiments, but may be provided with three or more connectors. In this case, the connection tray is locked in the projected positions the number of which corresponds to the number of the connectors. Also, a select button for manually selecting which connector to activate may be provided.

Furthermore, the connector having the eight pins and the connector having the thirty pins are provided in the above embodiment. However, the present invention is applicable to connection of portable terminal devices whose connection terminals do not have different pin numbers but have different structure.

In the above embodiments, the stopper is disposed behind one of the two connectors, but the stopper may be disposed behind each of the connectors.

Furthermore, according to the above embodiments, the music data recorded to the portable terminal device is reproduced by the CD player having the connection tray unit. However, a DVD (BD) player having the connection tray unit may reproduce not only the music data but also moving image data recorded to the portable terminal device. In this case, the moving image data recorded to the portable terminal device is sent through a connector and a controller of a DVD (BD) to a display connected to the DVD (BD) and displayed thereon.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A connection tray unit for a portable terminal comprising:
    a connection tray that is shiftable from a retracted position within a cabinet through a first projected position pulled out of said cabinet to a second projected position pulled out of said cabinet, the first projected position being different from the second projected position, and shiftable in an opposite direction thereof;
    a first connector mounted on and attached to said connection tray, for being connected to a first type portable terminal device in said first projected position;
    a second connector mounted on and attached to said connection tray, for being connected in said second projected position to a second type portable terminal device having a connection method different from said first type portable terminal device;
    a locking mechanism for locking said connection tray in said first and second projected positions to prevent a shift of said connection tray; and
    an unlocking mechanism for unlocking said locking mechanism to allow the shift of said connection tray.

2. The connection tray unit for the portable terminal according to claim 1, wherein said locking mechanism includes:

a lock plate having a lock boss, said lock plate being attached to said connection tray in a displaceable manner;

a lock bracket for displacing said lock plate by contacting said lock boss, while said connection tray is shifted from said retracted position to said second projected position;

a lock depression formed in said lock bracket, said lock boss being inserted into said lock depression upon shifting said connection tray to said first projected position, so that said connection tray is locked in said first projected position; and a lock projection formed in said lock bracket, said lock projection receiving said lock boss upon shifting said connection tray to said second projected position, so that said connection tray is locked in said second projected position.

3. The connection tray unit for the portable terminal according to claim 2, wherein said unlocking mechanism includes:

an unlock button provided in said connection tray; and a movable plate coupled to said unlock button, said movable plate being moved in conjunction with operation of said unlock button, the movement of said movable plate deforming said lock plate so as to unlock said locking mechanism.

4. The connection tray unit for the portable terminal according to claim 3, further comprising:

a refraction locking mechanism for locking and unlocking said connection tray in said retracted position.

5. The connection tray unit for the portable terminal according to claim 1, further comprising:

a stopper provided in said connection tray, said stopper being turnable between a raised position raised behind said first connector and a folded position, for bearing a rear surface of said first type portable terminal device connected to said first connector in said raised position.

6. The connection tray unit for the portable terminal according to claim 5, wherein if said connection tray is shifted toward said retracted position in a state where said stopper is set in said raised position, said stopper bumps against said cabinet and turns to said folded position.

* * * * *